May 23, 1961 P. H. HALPERN 2,985,771

TRANSISTOR SWITCHING SYSTEM

Filed July 29, 1958 3 Sheets-Sheet 1

2,985,771

TRANSISTOR SWITCHING SYSTEM

Peter H. Halpern, Poughkeepsie, N.Y., assignor to International Business Machines Corporation, New York, N.Y., a corporation of New York Filed July 29, 1958, Ser. No. 751,785

23 Claims. (Cl. 307—88.5)

Figure 1:
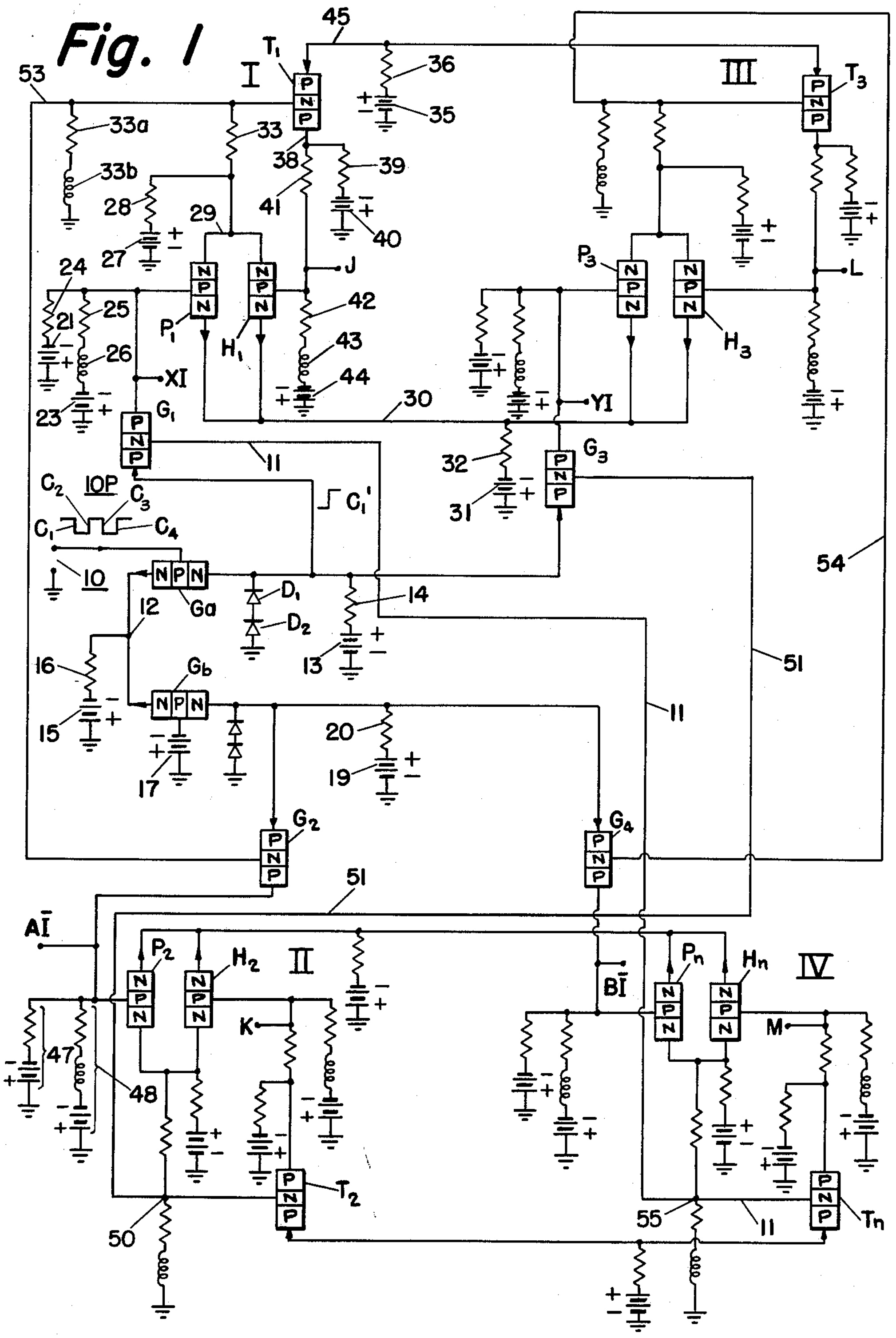

This invention relates to an N-stable device and has for an object the provision of a direct coupled N-stable device comprising N-sets of transistors which function together to perform ring-counting functions. Ring counters, besides having wide application in computer equipment, are also used as timing devices and as important building blocks in other types of circuits.

In carrying out the present invention in one form thereof, only four transistors per count are required plus two additional transistors for the total count of the ring counter. The respective sets of transistors are all direct coupled. In this manner, there are avoided time delays and the need to use non-conductive coupling elements in the system. Accordingly, the speed of response is limited only by the speed of response of the transistors themselves, since there is an absence of reactive coupling elements in the associated circuitry. The clock associated with the ring counter need operate but half as fast as has been previously required, since in accordance with the present invention, there are utilized both the positive and the negative going voltages derived from the clock to operate the ring counter. Thus, the time basis of the ring counter may be a half period of the clock pulse repetition frequency instead of a full period. However, outputs may be derived from the ring counter which are either a full period wide or a half period wide.

Further in accordance with the invention, there are provided in the system N-sets of transistors, each set including a trigger, a holding, and a pull-over transistor. A gating transistor is associated with each set. The emitters of the transistors of each of the foregoing types for each set are connected together and thus to a common reference potential which assures that when a particular transistor is rendered conductive, the remaining transistors connected to the emitter of the conductive transistor are maintained non-conductive. The holding and pull-over transistors are connected in parallel, and connections extend between the collectors of that parallel pair of transistors and the base of the associated trigger transistor in each set. By means of current sources connected to the transistors, a pulse passed by a gating transistor to the parallel pair renders conductive the pull-over transistor and the associated trigger transistor. Upon disappearance of the pulse, the holding transistor becomes conductive to maintain the trigger transistor conductive until the next pulse is applied, at which time a gate which has been conditioned by the preceding trigger functions to apply that pulse to the next set of transistors. This operation continues with the several sets of transistors being rendered conductive in sequence to complete the count of pulses applied by the clock.

Figure 2:
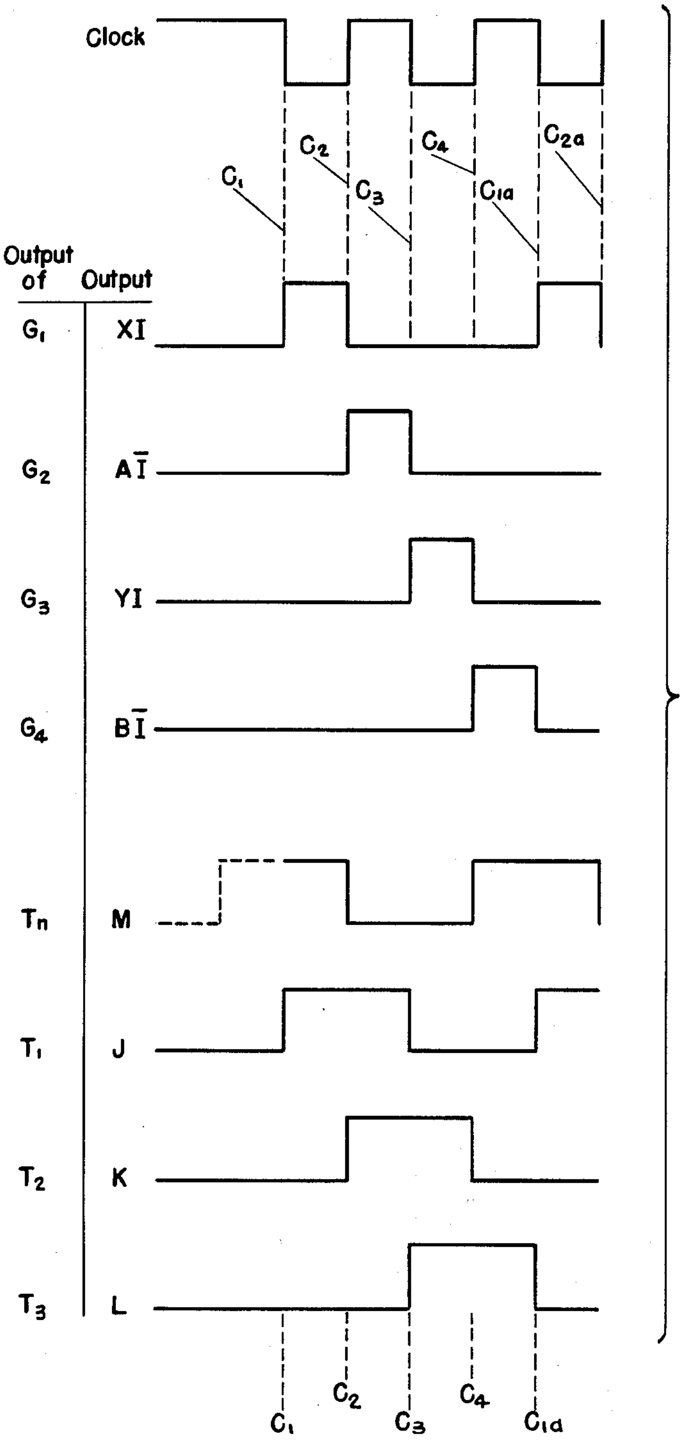
Figure 3:
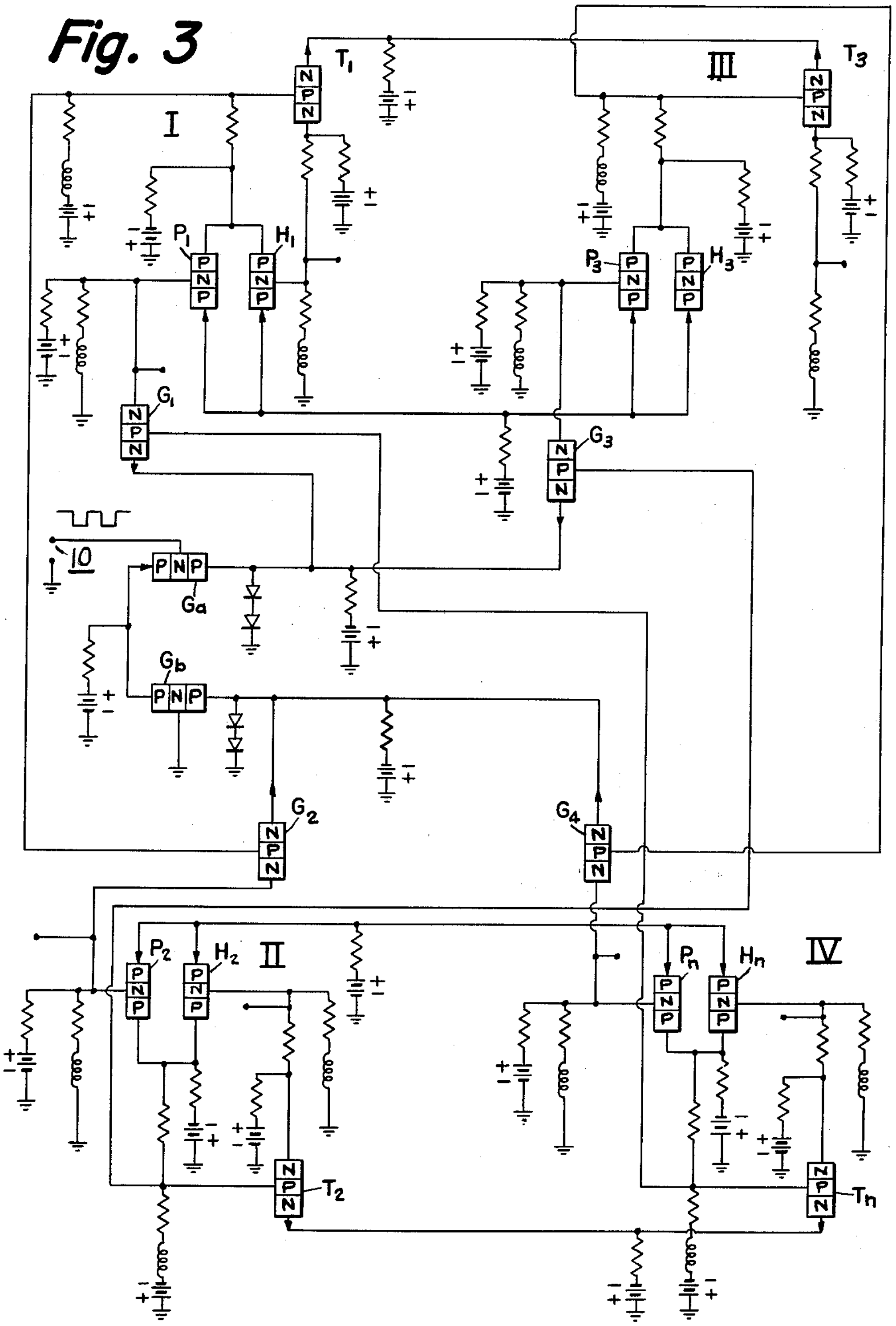

For a more detailed disclosure of the invention and for further objects and advantages thereof, reference is to be had to the following description taken in conjunction with the accompanying drawings, in which:

Fig. 1 schematically illustrates a ring counter of N-stages;

Fig. 2 is a timing diagram helpful in the explanation of the operation of Fig. 1; and Fig. 3 schematically illustrates a ring counter with opposite types of transistors respectively substituted for those illustrated in Fig. 1.

Though the present invention is applicable to N-stages of a ring counter, only four such stages I–IV have been illustrated in Fig. 1. The operation as a ring counter or timing device is, in end result, more or less conventional to ring counters under the control of a device generally referred to by those skilled in the art as a "clock." The clock input pulses are applied to the input terminals 10. These pulses, as indicated at 10*p*, include first a negative going pulse $C_1$ and then a positive going pulse $C_2$. These pulses continue as indicated by $C_3$ and $C_4$. Upon application of the negative going pulse $C_1$, counter stage I is energized, and as pulses $C_2$, $C_3$ and $C_4$ are applied, stages II, III and IV are in turn energized, each preceding stage being deenergized as the next becomes effective. In order to achieve the foregoing operation with direct coupling throughout the ring counter, use is made of a switching circuit disclosed and claimed by Hannon S. Yourke in application Serial No. 622,307, filed November 15, 1956, entitled "Transistor Switching Circuits," now Patent No. 2,964,652, and assigned to the same assignee as the present invention.

It will now be assumed that the trigger transistor $T_n$ of stage IV is conductive and that the connection from the base by way of conductor 11 to the base of the gating transistor $G_1$ is effective to condition that transistor for conduction upon application thereto of a negative-going input pulse $C_1$. When the negative going impulse $C_1$ is applied at the input terminals 10, the gate-enabling transistor $G_a$, shown as of the NPN type, is made non-conductive. As a result, the node or junction 12 becomes more negative which has the effect of making the gate-enabling transistor $G_b$ conductive. The increased negative bias at junction 12 is applied to the emitter of transistor $G_b$ and has the same effect as making the base more positive (less negative), and thus the reverse bias is overcome and transistor $G_b$ conducts.

The batteries 13, 15 and 19 in conjunction with the series resistors 14, 16 and 20 form what may be considered constant current sources. The two sources supplying current to the gate-enabling transistor provide six milliamperes. The battery 15 and the resistor 16 comprise a current "sink," i.e., a source of seven milliamperes with the current flow out of the network. The battery 17 provides a reverse bias for the transistor $G_b$ with a value, for example, as −6 volts.

As transistor $G_b$ becomes conductive, the current flow through resistor 20 makes the emitters of transistors $G_2$ and $G_4$ less positive (more negative) which is the same as making the base of each transistor more positive. The resultant reverse bias maintains transistors $G_2$ and $G_4$ non-conductive.

As transistor $G_a$ is made non-conductive by the applied pulse $C_1$, there appears at its collector output a positive pulse $C_1$ which is applied to the emitter of the gating transistor $G_1$ of the PNP type. The gating transistor $G_1$, through the connection by way of conductor 11, has had the potential of its base lowered, i.e., made more negative. It was made more negative since transistor $T_n$ had been on. With transistor $T_n$ conductive, transistor $H_n$ was also on. Thus the potential at the collector of the transistor $H_n$, specifically the node or junction 55, was made more negative by flow of current through transistor $H_n$. Thus, transistor $G_1$ was "conditioned" by the trigger and holding transistors $T_n$ and $H_n$ to respond to the output pulse $C_1'$. Thus. the positive pulse $C_1'$ has the effect of making the base more negative, and thus transistor $G_1$ is made conductive. Current thereupon flows from the source, 13, 14, to current sinks including batteries 21 and 23, each including series resistors 24 and 25. Additionally, there is included in circuit with the battery 23 a peaking coil 26 which, though desirable, is not essential to the operation of the system being described. Thus there appears at the collector of transistor $G_1$ a positive going pulse which through the connection of that collector to the base of the pull-over transistor $P_1$ makes the transistor $P_1$ conductive. The presence of peaking coil 26 has the effect of sharpening the pulse and can be included when required in view of the nature of the applied input pulses.

It may be observed that there is a local circuit including the batteries 21 and 23 which provides a normal reverse bias for transistor $P_1$ which is overcome by the applied positive going pulse which has just been described. Current flows through transistor $P_1$ from a 3 milliampere source comprising a battery 27 and a resistor 28 and by way of conductors 29 and 30 to a 6 ma. source comprising a battery 31 and a resistor 32. The flow of current through transistor $P_1$ makes the conductor 30 more positive, and since the emitters of transistors $H_1$, $P_3$ and $H_3$ are all connected to conductor 30, they are respectively reversely biased and, accordingly, are maintained non-conductive so long as transistor $P_1$ connected to conductor 30 is conductive. As soon as $P_1$ becomes conductive, there appears at its collector an output pulse applied by way of conductor 29 and a resistor 33 to the base of trigger transistor $T_1$, of the PNP type. The pulse of negative-going character makes transistor $T_1$ conductive. Current flows through transistor $T_1$ from a 6 ma. source comprising a battery 35 and a resistor 36, the current dividing at the node or junction 38, a part flowing through a resistor 39 and by way of battery 40 to ground, and the other part flowing through resistors 41, 42 a peaking coil 43, and by way of battery 44 to ground.

Since the emitters of transistors $T_1$ and $T_3$ are connected together by conductor 45, the emitter of transistor $T_3$ is made less positive when transistor $T_1$ conducts and, therefore, transistor $T_3$ is maintained non-conductive as long as transistor $T_1$ conducts. If desired, an output circuit may be connected, as at output terminal J to receive the output from the transistor $T_1$ which appears as it is made conductive. The output from transistor $T_1$ is also applied to the base of the holding transistor $H_1$. This conditions transistor $H_1$ for conduction, but as noted above, it cannot conduct as long as transistor $P_1$ is conducting. Transistor $P_1$ becomes non-conductive upon application to the input terminals 10 of the positive going pulse $C_2$. As will be later explained in detail, the positive going pulse $C_2$ makes transistor $G_a$ conductive and transistor $G_b$ non-conductive; it makes transistor $G_1$ non-conductive which, in turn, shuts off or renders non-conductive pull-over transistor $P_1$. Since transistor $H_1$ has been conditioned to be conductive, transistor $H_1$ becomes conductive as transistor $P_1$ becomes non-conductive, thus to maintain conductive the transistor $T_1$.

There has thus far been described the manner in which the present system provides an N-stable device and which permits the direct conductive coupling of the several components participating in the operation and action of the first stage of the ring counter. It will now be helpful briefly to review the foregoing operation in terms of the time sequence in which they occur. For this purpose, reference is made to the timing diagram of Fig. 2.

At the output terminal from the collector of transistor $G_1$ there appears an output signal labeled, in Figs. 1 and 2, as XI. This output signal lasts for a time interval corresponding with the time spacing between the negative going input pulse $C_1$ and the positive going pulse $C_2$. This is another way of saying that the time duration of the output pulse XI is equal to the duration of the negative going pulse $C_1$. Since initially it was assumed that transistor $T_n$ was conductive, there appeared at the output terminal from the collector of that transistor an output signal labeled, in Figs. 1 and 2, as M. It will be noted that it has a time duration twice that of the output pulse XI and for reasons which will be made clear as the description proceeds. Upon appearance of the positive going pulse $C_2$, or at the termination of the negative going pulse $C_1$, there appears an output $A\bar{I}$ at the correspondingly marked output terminal of Fig. 1 at the collector of transistor $G_2$. The manner in which this pulse is generated and the manner in which the output pulse M is terminated will now be described.

Remembering that as gate-enabling transistor $G_a$ was made conductive, transistor $G_b$ was made non-conductive. Since the base of gating transistor $G_2$ of the PNP type had been made more negative when trigger transistor $T_1$ was made conductive, this gating transistor $G_2$, upon appearance at the collector of transistor $G_b$ of a positive going pulse, makes transistor $G_2$ conductive. As above described, it applies a reverse bias to transistor $G_4$ to maintain it non-conductive. The output pulse from the collector of transistor $G_2$ is applied to the base of the pull-over transistor $P_2$ of the NPN type, and being a positive going pulse makes that transistor conductive. In this connection, it will be noted that there are provided current sinks, or sources, 47 and 48 of like character with the described sources including the batteries 21 and 23.

In manner similar to that described for stage I, there is applied from the collector of transistor $P_2$ to the base of trigger transistor $T_2$ a pulse which makes the latter conductive. Accordingly, there appears an output pulse K at the similarly labeled output terminal from the collector of trigger transistor $T_2$. The negative going pulse applied to trigger transistor $T_2$ is of magnitude adequate to insure that it will be made conductive with current flow therethrough from 6 ma. source. The result is that the emitter of transistor $T_n$ is made less positive, and thus transistor $T_n$ is made non-conductive, marking the end of the output pulse M from its collector output terminal M. Output pulse $A\bar{I}$ continues until the termination of the positive going pulse $C_2$ and the appearance of the negative going pulse $C_3$. The conductivity states of the gate-enabling transistors $G_a$ and $G_b$ return to the same states as produced by negative going input pulse $C_1$ which, it will be recalled, made transistor $G_a$ non-conductive and transistor $G_b$ conductive. However, negative going pulse $C_3$ does not make the gating transistor $G_1$ conductive because the conditioning bias applied by way of conductor 11 from transistor $T_n$ disappeared at the time $T_n$ became non-conductive. A corresponding conditioning bias is applied from node or common junction point 50 from the base of transistor $T_2$ and is applied by way of conductor 51 to the base of gating transistor $G_3$. Accordingly, input pulse $C_3$ makes gating transistor $G_3$ conductive, and in manner identical with the operation of stage I, pull-over transistor $P_3$ is made conductive which, in turn, makes trigger transistor $T_3$ conductive. Thus, as $G_3$ becomes conductive, there appears an output YI in the correspondingly labeled output terminal, and there appears an output L at the correspondingly labeled output terminal from the collector of transistor $T_3$.

The gate-enabling transistor $G_b$ upon being rendered conductive applies a negative going pulse to the emitter of gating transistor $G_2$ and in addition, the bias applied to the base of gating transistor $G_2$ by conductor 53 from the base of trigger transistor $T_1$ has disappeared, thus $G_2$ becomes non-conductive. Transistor $G_4$ remains non-conductive, but there is applied to the base thereof by way of conductor 54 from the base of trigger transistor $T_3$ a bias conditioning it for operation upon appearance of the positive going pulse $C_4$. The latter pulse changes the states of transistors $G_a$ and $G_b$ in the same manner as the positive going pulse $C_2$. With transistor $G_a$ conductive, pulse $C_4$ results in a negative pulse being applied to the base of $G_3$ and turns it off or makes it non-conductive, which in turn turns off or makes non-conductive transistor $P_3$. The holding transistor $H_3$ then becomes conductive to maintain trigger transistor $T_3$ in its conductive state, this operation prolonging the time delay of the output pulse L for the total time between the negative pulses $C_3$ and $C_{1a}$.

Since gating transistor $G_4$ has already been conditioned when transistor $G_b$ is made non-conductive, the positive going pulse applied to the emitter makes transistor $G_4$ conductive, and the resultant operations are identical with those heretofore described, namely, pull-over transistor $P_n$ is made conductive which, in turn, makes trigger transistor $T_n$ conductive. Thus, there appears the output $B\bar{I}$ at the output terminal from the collector of gating transistor $G_4$. There also appears at the output terminal M the output pulse M. As above described, the bias from the node or junction 55 is applied to the base of gating transistor $G_1$ by conductor 11 to condition it for the succeeding negative going pulse $C_{1a}$. This negative going pulse corresponds exactly with the initial input pulse $C_1$, and there is thus initiated a new cycle of operations which are repetitions thus far described in some detail.

With the above understanding of the invention and the manner in which each stage is made up of the parallel pairs of connected transistors, such as $P_1$, $H_1$, the trigger transistor $T_1$ associated with the gating transistor $G_1$, and with the cross connections for the sequential operation of the several stages, it will be understood how each ring counter may be provided with as many stages as desired, and also how ring counters may be cascaded and connected for decade operation. For example, if after a count of four, as above described, it is desired to record that fact, an output signal may be taken from output terminal M and applied to a second ring counter identical to that of Fig. 1. Thus, each time there is a count of four by the system of Fig. 1, there will be an output signal to operate the second ring counter.

It is to be further noted that the system of the present invention includes the concept of providing two N-stable networks, as in two banks, having respectively associated therewith pulse-enabling gates which produce operation of a stage first in one bank, and then operation of a stage in a second bank. The resultant operation may be expressed in terms of the following circuit-logic.

$$XI$$

$$A\bar{I}$$

$$YI$$

$$B\bar{I}$$

The nomenclature of the foregoing logic has already been utilized, and it means in part that for each applied input pulse, there is an output pulse on one, and only one, of the correspondingly labeled output terminals. Thus, if I be representative of a negative going pulse, and $\bar{I}$ be representative of a positive going pulse, it will be seen that there will be an output at either XI or YI for a negative going input pulse, but there will not be an output at both of them. The same thing applies for the output terminals $A\bar{I}$ and $B\bar{I}$. When a negative pulse is not applied (or when there is applied a positive pulse), there will be an output at $A\bar{I}$ or $B\bar{I}$, but never simultaneous outputs.

As already explained, the foregoing output terminals are not the only ones available for use in connection with the system of Fig. 1. By utilizing the output terminals J–M, from the trigger transistors, the resultant output signals will be a full period wide, whereas the outputs from the gating transistors $G_1$–$G_4$ will be a half period wide of the clock input pulse repetition frequency. Since the trigger transistors of one bank are reset only on negative going voltages of the clock, and the trigger transistors $T_2$ and $T_n$ are reset only on positive going voltages of the clock, the time difference is a half period, as above noted, instead of a full period. When the respective sets of transistors in the two banks are operated in turn and at the rate of twice per period of the clock, the clock need operate but half as fast as the rate at which the resultant count is made.

Referring now to Fig. 3, it will be noted that the system is similar to Fig. 1 except that wherever in Fig. 1 a transistor of one type was utilized, in Fig. 3 a transistor of the opposite type has been illustrated. Corresponding changes have been made in the polarity and location of the associated current sources. The stages and the individual transistors in Fig. 3 have been given the same reference characters as in Fig. 1. Aside from the foregoing, the other significant change is that the input clock pulese **10*p* applied to the input terminals 10** originate with a positive going pulse. This change has been made in order that the timing diagram of Fig. 2 will be applicable to the system of Fig. 3.

With the above understanding of the invention, those skilled in the art will understand how to select the various circuit components and to provide the indicated current sources and current sinks. As further guidance, the resistor 25 may be 270 ohms, with the peaking coil 26 having an inductance of 2.7 microhenries. The resistor 33 may have a value of 100 ohms, while the resistor **33*a* and the peaking coil 33*b* may respectively have values of 120 ohms and 0.82 microhenry. Similarly, resistors 41 and 42 will have values respectively of 100 and 120 ohms, with peaking coil 43** of 0.82 microhenry. Like values will be utilized for corresponding parts in the remaining stages III and IV. Though not necessary, it may sometimes be desirable to include one or more diodes for protective purposes, such as the diodes $D_1$ and $D_2$ in series and connected between the respective collectors of transistors $G_a$ and $G_b$ and ground. These diodes become conductive when the output from the respective collectors exceeds a predetermined value and thus limit the negative excursion of the respective output signals from transistors $G_a$ and $G_b$.

While there have been shown and described and pointed out the several features of the invention as applied to a simplified embodiment thereof, it will be understood that additional changes and modifications may be made within the scope of the appended claims.

What is claimed is:

1. A sequentially operating switching system comprising a bank of transistor devices each having at least two stable operating conditions and arranged in sets, each said set of transistor devices of said bank including a pulse-directing transistor, a pull-over transistor, a holding transistor and a trigger transistor, each of said pulse-directing, pull-over, holding and trigger transistors of each of said sets being respectively interconnected with like transistors of another of said sets of said bank for preventing the operation of like transistors of said other of said sets of said bank upon operation of one of said interconnected transistors of one of said sets from one stable condition to the other, means for applying to said pulse-directing transistor time-spaced input pulses, connections between each trigger transistor of a set to a pulse-directing transistor of another of said sets to condition said pulse-directing transistor for preferential operation upon application thereto of one of said input pulses, and means interconnecting said transistors of each said set for setting in like stable set conditions and in succession (1) said pull-over transistor in response to operation of said pulse-directing transistor, (2) said trigger transistor in response to the operation of said pull-over transistor whereby said trigger transistor conditions but does not operate said holding transistor, and (3) in response to a return of said pulse-directing transistor to its initial stable condition operating said pull-over transistor to its initial stable condition for operating said holding transistor to its stable set condition to maintain said trigger transistor in its said stable set condition, said interconnection between said trigger transistors including means for returning to their initial stable conditions the holding and trigger transistors of a preceding set in response to a setting operation of a trigger of a subsequent set resulting from the application to the conditioned pulse-directing transistor of said subsequent set of one of said time-spaced input pulses.

2. The switching system of claim 1 in which said pulse-directing and trigger transistors are of one type and in which said pull-over and holding transistors are of another type, the transistor of one said type being rendered conductive upon application to control electrodes thereof of a negative going pulse while the transistors of the other type are rendered conductive upon application thereto of a positive going pulse.

3. The switching system of claim 1 in which said bank of switching devices is arranged in sub-banks, each sub-bank being characterized by a common control circuit connected to the gating transistors thereof, a pair of interconnected transistors, one of which is in one stable condition while the other of which is in the opposite stable condition, and means applying to at least one of said interconnected transistors negative going and positive going control signals for developing and applying said time-spaced input pulses to said sub-banks of transistors.

4. The switching system of claim 1 in which said interconnected like transistors of said sets comprise the connection together of the emitters of each like transistor of each said set.

5. The switching system of claim 3 in which said interconnection of like transistors of each said set comprises connecting together the emitters of each like transistors of each said sub-bank and in which said connections between each trigger transistor and a pulse-directing transistor extends first to a set of one sub-bank and then to a set of the other sub-bank, these interconnections continuing in succession until all trigger transistors and pulse-directing transistors have been interconnected.

6. A sequentially operating switching system comprising a bank of switching devices each having at least two electrically conductive and non-conductive stable operating conditions and arranged in sets, each said set of devices including a pulse-directing device, a pull-over device, a holding device, and a trigger device, each of said pulse-directing, pull-over, holding and trigger devices of each of said sets being respectively interconnected with like devices of another of said sets of said bank for preventing the operation of like devices of said other of said sets of said bank upon operation of one of said interconnected devices of one of said sets from one stable condition to the other, means for applying to said pulse-directing devices time-spaced input pulses, connections between each trigger device of a set to a pulse-directing device of another of said sets to condition said pulse-directing device for preferential operation upon application thereto of an applied input pulse, and means interconnecting said devices of each said set for setting in like stable set conditions and in succession (1) said pull-over device in response to operation of said pulse-directing device, (2) said trigger device in response to operation of said pull-over device whereby said trigger device conditions but does not operate said holding device, and (3) in response to a return of said pulse-directing device to its initial stable condition operating said pull-over device to its initial stable condition and operating said holding device to its stable set condition to maintain said trigger device in its said set stable condition, said interconnection between said trigger devices including means for returning to their initial stable conditions the holding and trigger devices of a preceding set in response to a setting operation of a trigger of a subsequent set resulting from the application to the conditioned pulse-directing device of said subsequent set of one of said time-spaced input pulses.

7. The system of claim 6 in which said switching devices comprise semi-conductive elements having respectively conductive and non-conductive states for said stable conditions.

8. A system comprising N-sets of transistors, each set including a trigger transistor, a holding transistor, and a pull-over transistor, a gating transistor for each said set, said gating transistors having their emitters connected together, said holding and pull-over transistors having their emitters connected together, a connection between the collectors of said last-named transistors to complete their connection in parallel with each other and said trigger transistors having their emitters connected together, a connection between the collectors of said parallel pair of transistors and the base of said trigger transistor, means for applying input impulses to one of said gating transistors to render it conductive, and means including current sources connected to said transistors for rendering conductive said pull-over transistor and said trigger transistor of said set including the conductive gating transistor, said holding transistor being rendered conductive upon termination of said input impulse to maintain said trigger transistor conductive and upon return of said gating and pull-over transistors to their non-conductive states.

9. The system of claim 8 in which biasing means are associated with each gating transistor normally biasing it to its non-conductive state and of magnitude requiring the application of a conditioning bias thereto from another of said sets of transistors to condition said gating transistor for operation from a non-conductive to a conductive state upon application thereto of one of said input impulses, whereby one and only one of said gates is at the same time in a conductive state.

10. A system comprising N-sets of transistors, each set including a trigger transistor, a holding transistor, and a pull-over transistor, a gating transistor for each set, said gating transistors having their emitters connected together, said holding and pull-over transistors having their emitters connected together, a connection between the collectors of said last-named transistors to complete their connection in parallel with each other and said trigger transistors having their emitters connected together, a connection betwen the collectors of said parallel pair of transistors and the base of said trigger transistor, means for applying impulses to one of said gating transistors to render it conductive, means including current sources connected to said transistors for rendering conductive said pull-over transistor and said trigger transistor of said set including the conductive gating transistor, said holding transistor being rendered conductive upon termination of said impulse to maintain said trigger transistor conductive and upon said gating and pull-over transistors returning to their non-conductive states, and a plurality of circuit means connecting a control electrode of a trigger transistor of one set to a control electrode of a gating transistor of a second set, the aforesaid connections being repeated in succession with the final connection being from the base of the trigger transistor of the Nth set to the base of the gating transistor of the first of said sets.

11. The sysem of claim 10 in which there are provided in each of two banks $$\frac{N}{2}$$

sets of transistors, and in which said circuit means interconnecting a control electrode of a trigger transistor of one bank to a control electrode of a gating transistor of the other bank, these connections being repeated until the trigger transistor of the Nth set of one bank is connected to the control electrode of the gating transistor of the first of the sets of the first bank.

12. The system of claim 10 in which there are provided in each of two banks $$\frac{N}{2}$$

sets of transistors, and said circuit means interconnecting the base of a trigger transistor of one bank to the base of a gating transistor of the other bank, these connections being repeated until the trigger transistor of the Nth set of one bank is connected to the base of the gating transistor of the first of the sets of the first bank.

13. The system of claim 10 in which said gating and trigger transistors are of one type and said pull-over and holding transistors are of the opposite type.

14. A logic circuit comprising a plurality of sets of transistors, one said set for each logic term, said transistors of each said set including a pull-over transistor and a holding transistor of like type connected in parallel with each other, a gating transistor for controlling the application to said pull-over transistor of a controlling impulse and a trigger transistor connected to said parallel-connected transistors operable under the control of them, said gating and trigger transistors being of a type opposite to said parallel-connected transistors, conductors respectively interconnecting into groups (1) the emitters of said gating transistors, (2) the emitters of said parallel-connected transistors, and (3) the emitters of said trigger transistors, each said conductor being connected to the same potential source whereby when any transistor of any group is rendered conductive the remaining transistors of that group are maintained non-conductive, cross-connections extending in succession between said trigger transistors of one set and said gating transistors of another of said sets to form a closed loop including all of said sets of transistors, and means for applying input impulses to said gating transistors.

15. The logic circuit of claim 14 in which said sets of transistors are divided into two banks and in which there are provided impulse-applying means for respectively applying impulses of one polarity to the gates of one said bank and impulses of opposite polarity to the other said bank.

16. The logic circuit of claim 15 in which there is included a gate-enabling transistor in circuit with said gating transistors of each said bank, and means for applying positive going and negative going impulses to one of said gate-enabling transistors for alternately and selectively rendering conductive a set of transistors in one bank, then a set of transistors in the opposite bank, this alternate operation continuing until each of said sets has in succession been rendered conductive for producing output signals in response to said input impulses.

17. The logic circuit of claim 14 in which biasing means are associated with each gating transistor normally biasing it to its non-conductive state and of magnitude requiring the application of a conditioning bias thereto by way of said cross-connection to condition the gating transistor for operation from a non-conductive state to a conductive state upon application thereto of one of said input impulses, whereby one and only one of said gates is at the same time in a conductive state.

18. A sequentially operating switching system comprising a bank of switching transistors each having at least two electrically conductive and non-conductive stable operating conditions and arranged in sets, each said set including a gating transistor, a trigger transistor and a holding and pull-over means including at least one transistor, said gating and trigger transistors each having at least one input terminal and one output terminal, means for applying input pulses to said input terminals of said gating transistors, said holding and pull-over means of each said set being connected to an output terminal of said gating transistor and also connected both to the input and output terminal of said trigger transistor of said last-named set, means interconnecting a trigger transistor of one of said sets and the gating transistor of another of said sets for conditioning said gating transistor for preferential operation upon application thereto of an applied input pulse, means interconnecting said transistors of each of said sets for rendering conductive in succession in each said set (1) a transistor of said holding and pull-over means in response to conduction of said gating transistor, and (2) said trigger transistor in response to conduction of said transistor of said holding and pull-over means, said holding and pull-over means acting to maintain said trigger transistor in a conductive state upon return of said gating transistor to its non-conductive state, and means for returning a conductive trigger transistor to its initial non-conductive state in response to the conduction of a trigger transistor of a subsequent set resulting from the application to the conditioned gating transistor of said subsequent set of one of said input pulses, said last-named means including a constant current source common to at least said last-named trigger transistors.

19. The system of claim 18 in which said one transistor of said holding and pull-over means is of one type and said gating and trigger transistors are of the opposite type.

20. The system of claim 18 in which the connections provided by said means interconnecting a trigger transistor in one of said sets and the gating transistor of another of said sets are repeated until the trigger transistor of the last of said sets is connected to the gating transistor of the first of said sets of transistors to form a ring-counter.

21. A system comprising N-sets of transistors, each set including interconnected transistors, one a trigger transistor, another a holding transistor, and a third a pull-over transistor, a gating transistor for each set having its output connected to the pull-over transistor of that set, said trigger transistor for each set having its input and output connected to the holding and pull-over transistors of that set, means including said interconnections for rendering conductive in succession said pull-over, said trigger and said holding transistors after said associated gating transistor is rendered conductive and for maintaining conductive said trigger transistor and at least one of said holding and pull-over transistors after said gating transistor becomes non-conductive, output circuits for each said set, one from said trigger transistor and the other from said other transistor maintained conductive after said gating transistor becomes non-conductive, one of said output circuits providing an output from said set of transistors and the other of said output circuits of each of said sets being connected to a gating transistor associated with a different one of said sets for conditioning said last-named gating transistor to be conductive, and means for applying input pulses to said gating transistors for rendering first one and then another of said gating transistors conductive and non-conductive as each in turn is conditioned to be conductive by its connection to said other of said output circuits of said different one of said sets of said transistors.

22. The system of claim 21 in which the connections provided by said means interconnecting a trigger transistor in one of said sets and the gating transistor of another of said sets are repeated until the trigger transistor of the Nth set is connected to the gating transistor of the first of said sets of transistors to form a ring-counter.

23. A ring-counter having one stage per count, a gating transistor, a trigger transistor and two switching transistors for each said stage, each said transistor having electrodes including an emitter, a base and a collector, circuit means conductively interconnecting the emitters of selected trigger transistors, a constant current source connected to said circuit means, means interconnecting said switching transistors of each stage between said collector electrode of said gating transistor and said base and collector electrodes of said trigger transistor of that stage for turning on said trigger transistor when said gating transistor is conductive and for maintaining on said trigger transistor when said gating transistor is non-conductive, means including a source of pulses to be counted for turning on a conditioned gating transistor upon appearance of each said pulse, and means including a connection from the output of one of said transistors of one stage to a control electrode of a gating transistor of a succeeding stage, these connections being repeated until the output of a transistor of the last stage is connected to the control electrode of one of said transistors of the first stage for conditioning for conduction first one and then a succeeding one of said non-conductive gating transistors to shift the count from stage to stage as said input pulses are applied to said gating transistors.

References Cited in the file of this patent

UNITED STATES PATENTS

| | | |
|---|---|---|
| 2,591,961 | Moore et al. | Apr. 8, 1952 |
| 2,823,856 | Booth et al. | Feb. 18, 1958 |
| 2,846,594 | Pankratz et al. | Aug. 5, 1958 |